US005704110A

United States Patent [19]

Erhard et al.

[11] Patent Number: 5,704,110

[45] Date of Patent: Jan. 6, 1998

[54] DEVICE FOR CRIMPING A PLASTICALLY DEFORMING METAL POLE SHOE AROUND THE END OF A CABLE

[75] Inventors: Anton Erhard, Marxzell; Werner Haag, Waghaeusel, both of Germany

[73] Assignee: Carl Freudenberg, Weinheim, Germany

[21] Appl. No.: 712,162

[22] Filed: Sep. 11, 1996

[30] Foreign Application Priority Data

Nov. 2, 1995 [DE] Germany ........................ 195 40 709.1

[51] Int. Cl.[6] ........................ B23P 23/00

[52] U.S. Cl. ........................ 29/566.3; 29/33 M; 29/705; 29/564.7; 29/753

[58] Field of Search ........................ 29/566, 566.1, 29/566.3, 33 M, 564.4, 564.7, 748, 753, 705, 715, 716

[56] References Cited

U.S. PATENT DOCUMENTS

| | | | |
|---|---|---|---|
| 4,087,908 | 5/1978 | Fusco et al. | 29/753 |
| 4,561,155 | 12/1985 | Randar et al. | 29/33 M |
| 4,641,428 | 2/1987 | Anderson | 29/863 |
| 4,667,397 | 5/1987 | Day et al. | 29/748 |
| 4,856,186 | 8/1989 | Yeomans | 29/863 |
| 4,916,810 | 4/1990 | Yeomans | 29/863 |
| 5,083,370 | 1/1992 | Koch et al. | 29/863 |
| 5,092,026 | 3/1992 | Klemmer et al. | 29/593 |
| 5,168,611 | 12/1992 | Hornung | 29/33 M |
| 5,168,613 | 12/1992 | Bair et al. | 29/33 M |
| 5,168,736 | 12/1992 | Enneper et al. | 29/705 |
| 5,197,186 | 3/1993 | Strong et al. | 29/863 |
| 5,271,254 | 12/1993 | Gloe et al. | 29/705 |
| 5,299,463 | 4/1994 | Gross | 29/753 |
| 5,337,589 | 8/1994 | Gloe et al. | 72/11 |

FOREIGN PATENT DOCUMENTS

| | | | |
|---|---|---|---|
| 5-29055 | 2/1993 | Japan | 29/566 |
| 5-29056 | 2/1993 | Japan | 29/566 |

*Primary Examiner*—Daniel W. Howell
*Assistant Examiner*—Christopher Kirkman
*Attorney, Agent, or Firm*—Furgang & Milde, LLP

[57] ABSTRACT

A device for crimping a plastically deforming metal pole shoe (1) around the end (2) of a cable that has been inserted into it. The device comprises an anvil (3), a die (4), a sensor (5), and a comparator (6). The shoe is placed on the anvil and the die is advanced toward it, deforming the shoe. The sensor emits a signal once the shoe has been deformed to the maximum, and the comparator compares the signal with a reference and emits either an "accept" signal or a "reject" signal. The "reject" signal emitted by the comparator actuates a cable-end trimmer that cuts part-way or all the way through the cable. Consequently, the device will always either acceptably crimp pole shoes to the ends of cables or reliably indicate defective connections.

4 Claims, 4 Drawing Sheets

DEVICE FOR CRIMPING A PLASTICALLY DEFORMING METAL POLE SHOE AROUND THE END OF A CABLE

BACKGROUND OF THE INVENTION

The present invention concerns a device for crimping a plastically deforming metal pole shoe around the end of a cable that has been inserted into it. The device comprises an anvil, a die, a sensor, and a comparator. The shoe is placed on the anvil and the die advanced toward it, deforming the shoe. The sensor emits a signal once the shoe has been deformed to the maximum, and the comparator compares the signal with a reference and emits either an "accept" signal or a "reject" signal.

A device of this kind is known. It is intended to fasten a pole shoe to the end of a cable tightly enough to produce an electrically conducting and physically permanent connection. The sensor accordingly senses the actual forces and/or directions of deformation that accompany every crimping process. The sensor emits an appropriate signal to the comparator, which compares it with a reference. Wide deviations from the reference indicate defective parts and are used to display a "reject" signal. When there are no deviations, the comparator displays an "accept" signal.

This method of evaluation is not very satisfactory. Fastening pole shoes to the ends of cables is usually piecework performed by unskilled labor. Distracted or tired, they sometimes tend to ignore the "reject" signals, and allow defective connections to be delivered. This situation cannot be tolerated where safety is a factor, in the connection of an airbag to the electronics of a motor vehicle for example.

SUMMARY OF THE INVENTION

The principal object of the present invention is to improve a device of the aforesaid type to the extent that it will always either acceptably crimp pole shoes to the ends of cables or reliably indicate defective connections.

This object, as well as other objects which will become apparent from the discussion that follows, are achieved in accordance with the present invention in a device of the aforesaid type by using a cable-end trimmer to cut part way or all the way through the cable in response to the "reject" signals emitted by the comparator such that the cable end remains substantially stationary between the crimping operation and subsequent cutting operation following the "reject" signal.

The aforesaid known device for determining defective crimped connections is accordingly exploited as a point of departure for the device in accordance with the present invention. Defective connections derive, for example, from pole shoes that are either mechanically of the wrong size, or are not thrust far enough onto the end of the cable. Such defects result in signals that unambiguously differentiate the connections from acceptable connections. They are used to signal the trimmer to cut at least part-way through any cable with an improperly mounted pole shoe. Defective connections can accordingly be easily detected and rejected without complicated separate inspection procedures. Even should such a connection be delivered, it would be impossible to connect it to other components, and the customer will be immediately aware of the defect.

In the simplest case, the end of the cable is completely cut through, eliminating the pole shoe. In this event it will be possible to correct the defect by re-inserting the end of the cable into the device and fastening another pole shoe to it. Any cable end leaving the device with a pole shoe attached to it can accordingly be considered acceptable.

The device can include a mechanism that strips the insulation from the cable before the pole shoe is crimped on. There is often not enough room to automatically remove separated cable ends. Usually, however, this is unnecessary, and the end can be only partly separated from the rest of the cable, leaving it swinging by only a thin strand of insulation. It is easy to remove such a freely suspended end manually once the cable has been extracted from the device. The original end can then be inspected to determine the cause of the damage and the new end re-inserted in the device.

The trimmer can be motorized. The motor can be electric, hydraulic, or pneumatic. The trimmer can also be driven automatically, by a spring for example, loaded as a byproduct of the device's overall operation. Motors with a high initial speed are preferred for the present invention. On the other hand, it is possible to employ a constantly running motor engaged and disengaged as necessary to actuate the trimmer.

Relatively narrow pneumatic cylinders have demonstrated to be particularly advantageous. The resulting length of stroke allows the area the cable end is introduced into to be left open, facilitating maintenance and access to the device. The mechanisms are preferably engaged with a timing vent between the cylinder and a compressed-air reservoir. The piston will accordingly be accelerated extremely rapidly. It will be moving at maximal speed and at a high momentum as it strikes the cable, allowing even thick ones to be easily severed and compensating for dull blades. This is a major advantage with respect to life and maintenance.

The trimmer can include shears that partly or entirely remove the end of the cable. Shears generate no reaction forces in the vicinity of the cable end, which therefore will not need to be secured particularly tightly while the cap is being applied.

The trimmer in another embodiment includes at least one cutter. The cutter can travel up and down in a guide and operate in conjunction with the anvil and/or with a counteracting cutter. Such a trimmer is very simple, especially when the cable end is not entirely severed.

The trimmer can include at least one mechanism, a clamp for example, for removing the severed end of the cable. The cable-end transport mechanism can operate in conjunction with a mechanism for removing the severed end of the cable from the device once the trimmer has completed its task.

The device in accordance with the present invention prevents defective connections between a pole shoe and the end of a cable. It is especially recommended for attaching pole shoes to the ends of cables when safety is a factor. Advantageously, the device can be easily manufactured or integrated into existing automatic cable preparation machinery. There is accordingly no reason to prevent its use in a wide range of applications.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
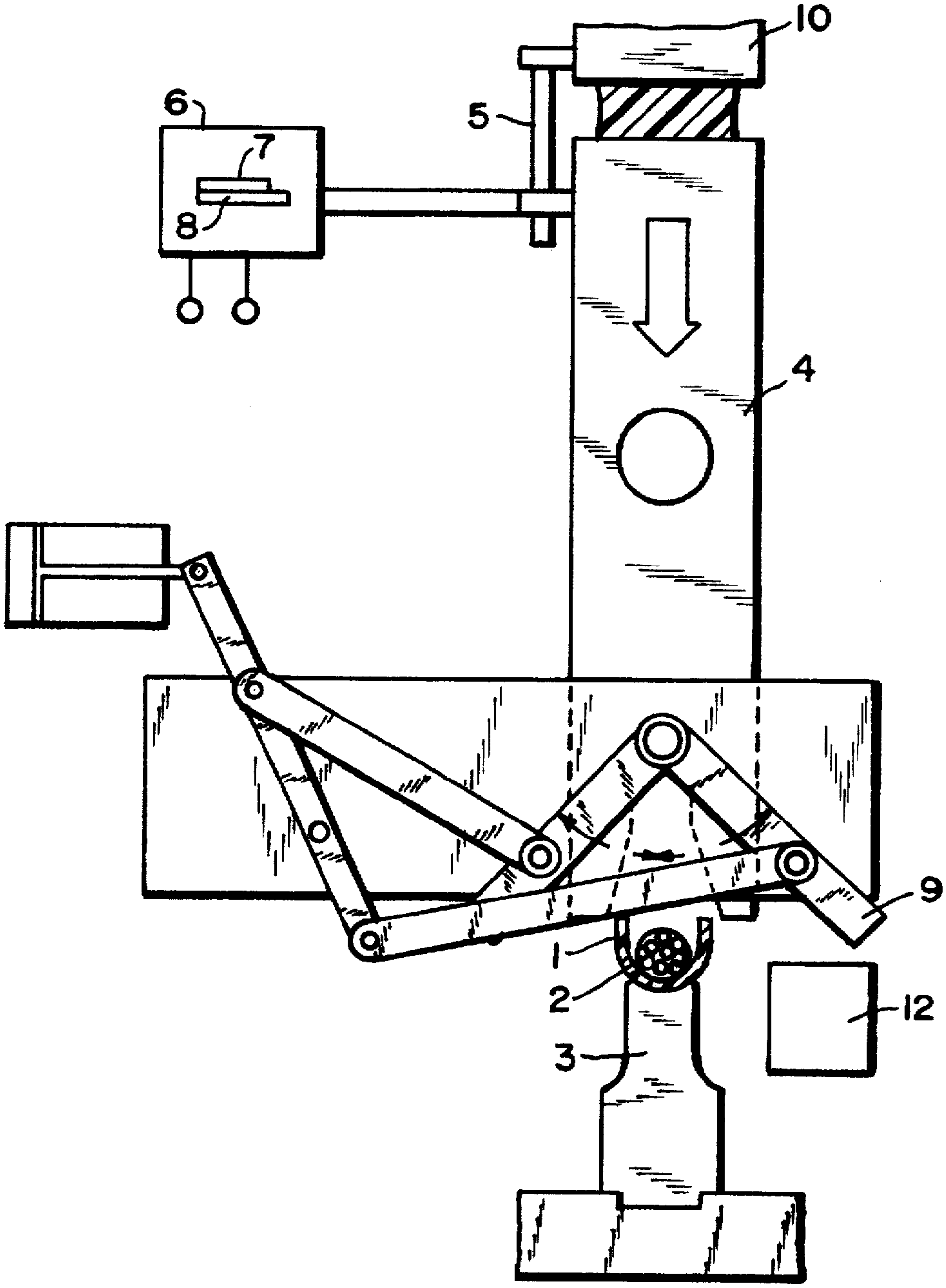
FIGS. 1 and 2 illustrate a device with a trimmer in the form of shears.

The preferred embodiments of the present invention will now be described with reference to FIGS. 1–4 of the drawings. Identical elements in the various figures are designated with the same reference numerals.

The device illustrated in FIG. 1 is intended for crimping a plastically deforming metal pole shoe 1 around the end 2 of a cable that has been inserted into it. The device comprises an anvil 3, a die 4, a sensor 5, and a comparator 6. The pole shoe 1 is placed on the anvil and the die 4 is advanced toward it, deforming the shoe. The sensor 5 emits a signal 7 once the shoe has been deformed to the maximum, and the comparator 6 compares signal 7 with a reference 8 and emits either an "accept" signal or a "reject" signal. The "reject" signals emitted by the comparator actuate a cable-end trimmer 9 that cuts through the cable. The newly created end can then be re-inserted in the device and provided with a new shoe.

The device illustrated in FIG. 1 is typical. Such devices are generally partly or entirely automatic. The end of a cable is inserted into a still open pole shoe, like the end 2 in the open pole shoe 1 illustrated in FIG. 1. The cable end passes a sensor that initiates a downward motion on the part of die 4. The motion of die 4 in relation to its drive mechanism 10 is detected by the sensor 5 and forwarded in the form of a signal 7 to the comparator 6. The comparator 6 contains a reference 8. The near identity of a signal 7 with the reference 8 indicates that pole shoe 1 has been properly fastened to the cable end 2. A significant discrepancy between the two values, on the other hand, indicates that the shoe has been improperly fastened. In the latter event the comparator 6 will actuate the cable-end trimmer 9, which will at least partly separate the cable end 2, along with the improperly mounted pole shoe 1 from the cable.

The cable-end trimmer 9 in the embodiment illustrated in FIG. 1 acts like a pair of shears and completely separates the end of the cable. The trimmed-off end is extracted from the device by mechanical or pneumatic means 12. A new cable can then be inserted and a new pole shoe fastened to it.

The signal representing the stroke traveled by die 4 can be detected by means other than, and at a point different from, those illustrated in FIG. 1 by one or more sensors in or on the machinery or in or under the anvil for example. The signal can optionally also represent the forces that ensue during the crimping process, which also indicate defective components.

Figure 2:
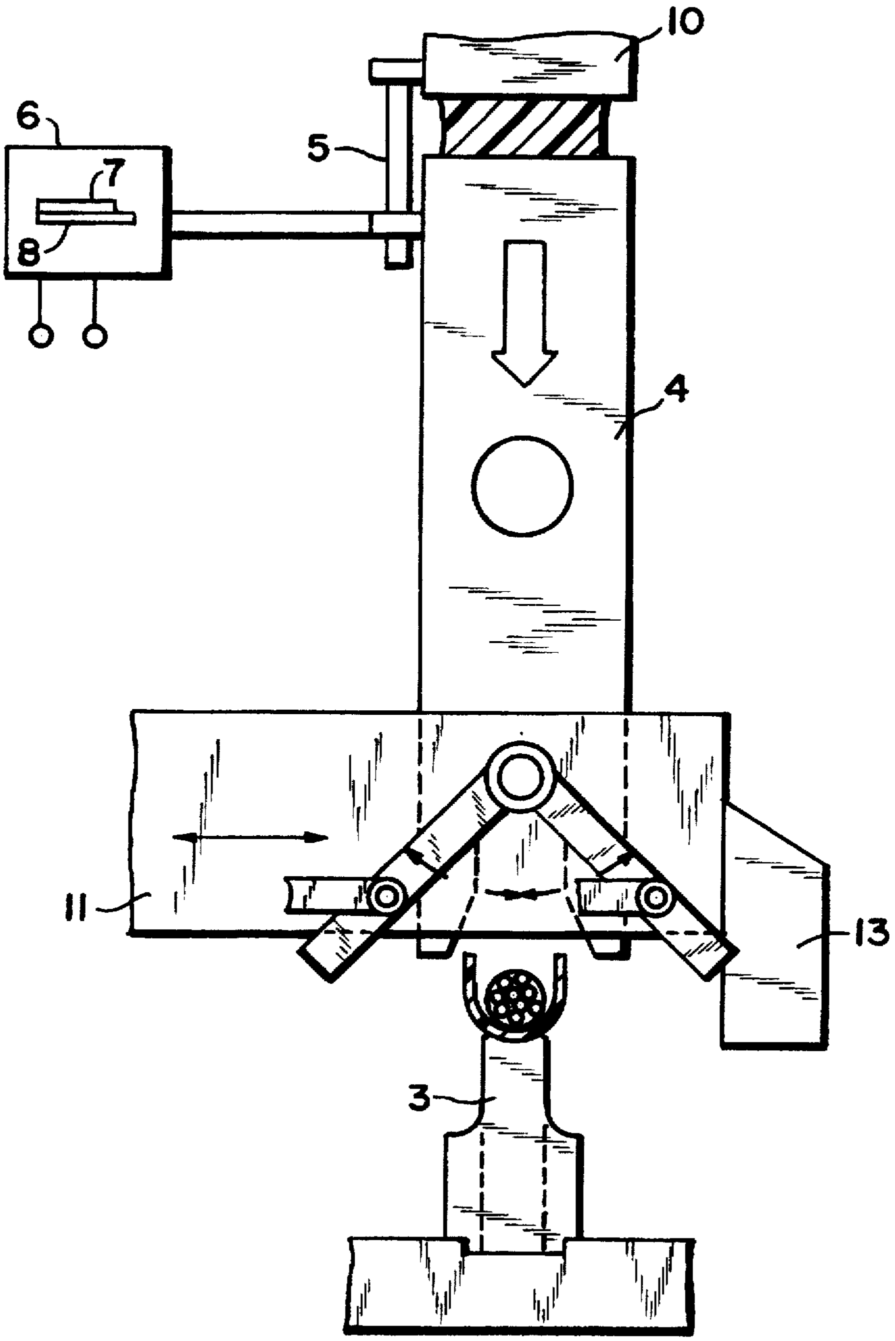

The shears-like cable-end trimmer 9 illustrated in FIG. 2 differs from the trimmer illustrated in FIG. 1 in that it is accommodated in a transversely moving plunger 11 and provided with a clamping device 13 for the separated cable end. The separated end can accordingly be extracted laterally from the device and discarded.

The cable-end trimmer 9 illustrated in FIGS. 1 and 2 is driven by a piston-and-cylinder mechanism powered by compressed air and connected to the trimmer by a pivoting lever and counteractive thrust rod. The compressed air is supplied from an unillustrated reservoir actuated by signals from the comparator 6. In the device illustrated in FIGS. 3 and 4, the cable-end trimmer comprises two cutters 9.1 that travel up and down toward and away from each other. The midsection of the cutters comprises mutually facing edges 9.3 with a stroke-limiting stop 9.2 on each side. When stops 9.2 are in contact, the edges 9.3 will be approximately 0.1 to 0.2 mm apart. The interval is just wide enough to prevent the cable end from being completely detached but still severed enough to be easily detached by hand once it has been extracted from the device. The distance between edges 9.3 that is needed to satisfy this requirement depends on the thickness of both the core and the insulation of the cable being provided with the pole shoe. Intervals of 0.1 to 0.3 mm are most practical. The precise intervals can be established by trial and error when necessary.

Figure 3:
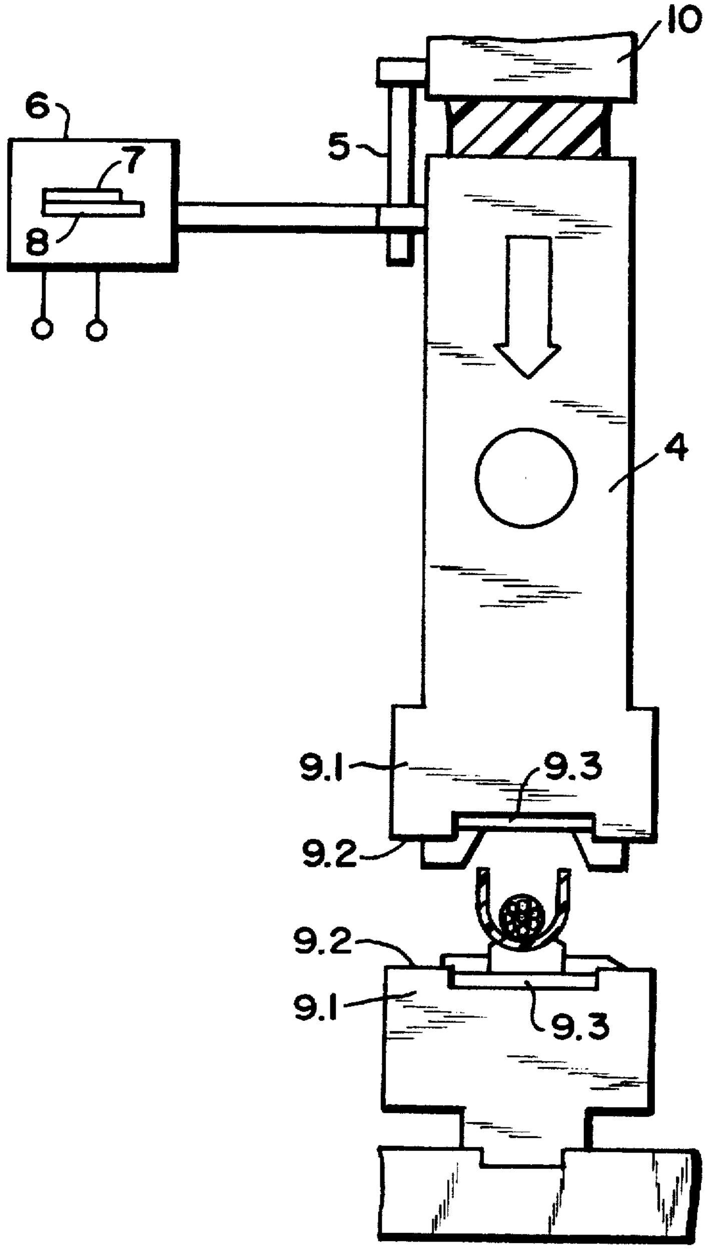
FIGS. 3 and 4 illustrate a device with a trimmer in the form of two cutters that move toward and apart from each other.
Figure 4:
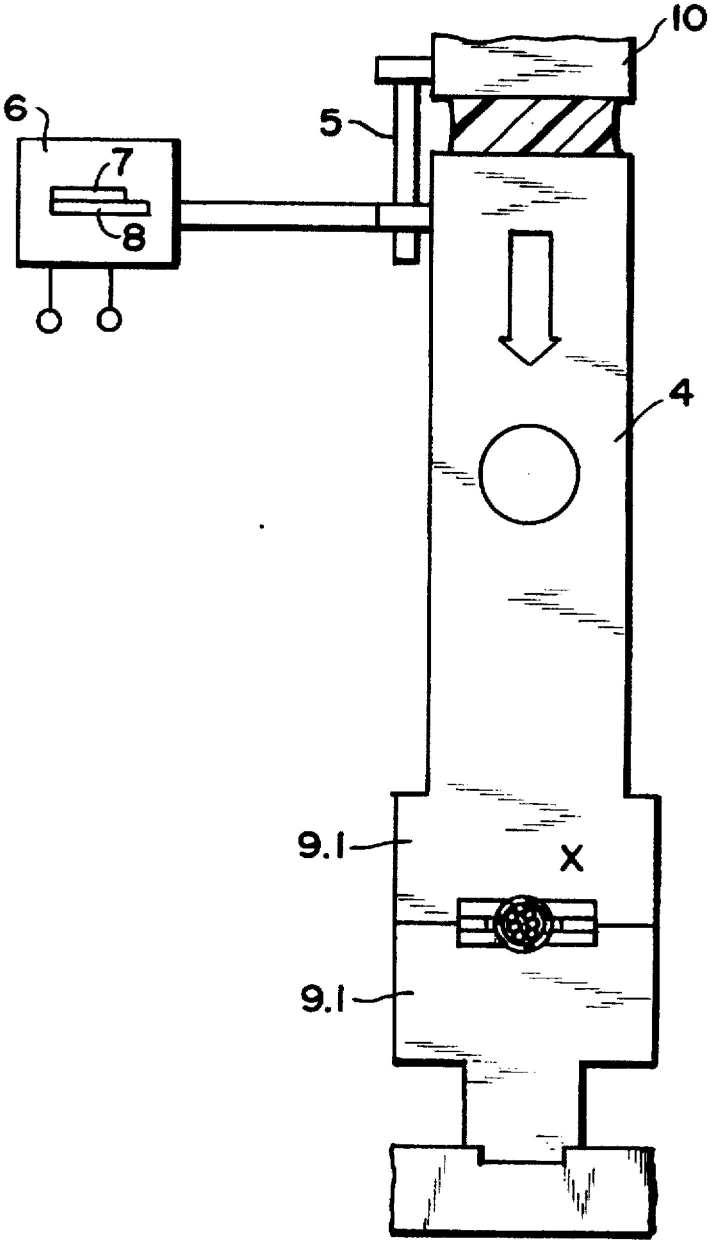

The embodiment illustrated in FIGS. 3 and 4 can be driven similarly to the embodiment illustrated in FIGS. 1 and 2.

There has thus been shown and described a novel device for crimping a plastically deforming metal pole shoe around the end of a cable which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for crimping a plastically deforming metal pole shoe around the end of a cable that has been inserted into it, said apparatus comprising an anvil, a die, a sensor, and a comparator, wherein the shoe is placed on the anvil and the die is advanced toward it, deforming the shoe, and wherein the sensor emits a signal once the shoe has been deformed to the maximum, and the comparator compares the signal with a reference and emits either an "accept" signal or a "reject" signal, the improvement comprising a cable-end trimmer that cuts part-way or all the way through the cable in response to a "reject" signal emitted by the comparator, said crimping apparatus and said trimmer being arranged such that the cable end remains substantially stationary between a crimping operation and a subsequent cutting operation following a reject signal.

2. The apparatus defined in claim 1, wherein the trimmer includes shears that partly or entirely remove the end of the cable.

3. The apparatus defined in claim 1, wherein the trimmer includes at least one cutter.

4. The apparatus defined in claim 1 wherein the trimmer includes at least one mechanism for removing the severed end of the cable.

* * * * *